(12) United States Patent
Di Serio et al.

(10) Patent No.: US 9,028,928 B2
(45) Date of Patent: May 12, 2015

(54) ACOUSTIC COMPONENT AND METHOD AND APPARATUS FOR PRODUCING SAME

(75) Inventors: Rocco Di Serio, Toronto (CA); Herbert Anton Jahn, Toronto (CA); Perry Rizzo, Stouffville (CA)

(73) Assignee: Axiom Group Inc., Aurora (CA)

( * ) Notice: Subject to any disclaimer, the term of this patent is extended or adjusted under 35 U.S.C. 154(b) by 341 days.

(21) Appl. No.: 13/525,100

(22) Filed: Jun. 15, 2012

(65) Prior Publication Data

US 2013/0017355 A1    Jan. 17, 2013

Related U.S. Application Data

(60) Provisional application No. 61/497,497, filed on Jun. 15, 2011.

(51) Int. Cl.
*B29C 70/84* (2006.01)
*B32B 7/04* (2006.01)
*B32B 27/12* (2006.01)
*B29C 45/14* (2006.01)
*B32B 27/32* (2006.01)
*B29L 31/30* (2006.01)

(52) U.S. Cl.
CPC ......... *B32B 27/12* (2013.01); *B29K 2995/0002* (2013.01); *B29C 45/14786* (2013.01); *B29C 45/14819* (2013.01); *B29L 2031/30* (2013.01); *B32B 27/32* (2013.01); *B32B 2262/0261* (2013.01); *B32B 2262/0276* (2013.01); *B32B 2307/102* (2013.01); *B32B 2605/00* (2013.01)

(58) Field of Classification Search
USPC .............................. 428/8; 301/37.372, 37.102
See application file for complete search history.

(56) References Cited

U.S. PATENT DOCUMENTS

2003/0011183 A1* 1/2003 Freist et al. ................... 280/770
2004/0075290 A1* 4/2004 Campbell .................... 296/39.3

\* cited by examiner

*Primary Examiner* — Brent O'Hern
(74) *Attorney, Agent, or Firm* — Davis Wright Tremaine LLP (57) ABSTRACT

According to embodiments described in the specification, a method and apparatus are provided for producing an acoustic component. The acoustic component comprises a first compression-molded member comprising a first material; and a second injection-molded member coupled to and substantially surrounding the first member, the second member comprising a second material.

7 Claims, 10 Drawing Sheets

ACOUSTIC COMPONENT AND METHOD AND APPARATUS FOR PRODUCING SAME

CROSS-REFERENCE TO RELATED APPLICATION

This application claims priority from U.S. Provisional Patent Application No. 61/497,497, filed Jun. 15, 2011, the contents of which is incorporated herein by reference.

FIELD

The specification relates generally to acoustic components, and specifically to an acoustic component and methods and apparatuses for producing acoustic components.

BACKGROUND

Motor vehicles, and indeed a wide selection of other machinery, include various sources of vibration, both audible and inaudible. Reducing the impact of such vibration on the machinery itself, associated machinery and the users thereof presents challenges relating to both the design and the manufacturing of components for such machinery.

BRIEF DESCRIPTIONS OF THE DRAWINGS

Embodiments are described with reference to the following figures, in which.

DETAILED DESCRIPTION OF THE EMBODIMENTS

According to an aspect of the specification, an acoustic component is provided, comprising a first compression-molded member comprising a first material; and a second injection-molded member coupled to and substantially surrounding the first member, the second member comprising a second material.

According to another aspect of the specification, an apparatus is provided for producing an acoustic component, the apparatus comprising: a core portion and a cavity portion, the core and cavity portions having an open position and a closed position in which the core portion is matingly received by the cavity portion; the core portion comprising an injection area and a compression area, the compression area for receiving an insert of a first material in the open position; the cavity portion comprising a mating injection area and a mating compression area, wherein the mating injection area lies adjacent to the injection area for defining an injection channel for receiving a second material in the closed position, and wherein the mating compression area lies adjacent to the compression area in the closed position for defining a compression chamber; at least one of the compression area and the mating compression area comprising a heater; at least one of the injection area and the mating injection area comprising a cooler; the injection area, mating injection area, compression area and mating compression area being configured for substantially simultaneous operation.

According to a further aspect of the specification, a method of producing an acoustic component is provided, the method comprising: receiving an insert of a first material in one of a core portion and a cavity portion, the core portion and cavity portion being in an open position; transitioning the core portion and the cavity portion to a closed position in which the cavity portion matingly receives the core portion to define a compression chamber containing the insert, and an injection chamber; activating a first controller for injecting a second material into the injection chamber, and a second controller for heating the compression chamber.

Referring now to FIG. 1, views of an example acoustic component, in the form of a wheel liner 100, are depicted. Although wheel liner 100 is provided as an exemplary acoustic component, a wide variety of acoustic components having both automotive applications (including those other than wheel liners) and non-automotive applications are contemplated. Examples of such additional acoustic components will become apparent to those skilled in the art throughout this specification.

Figure 1A:
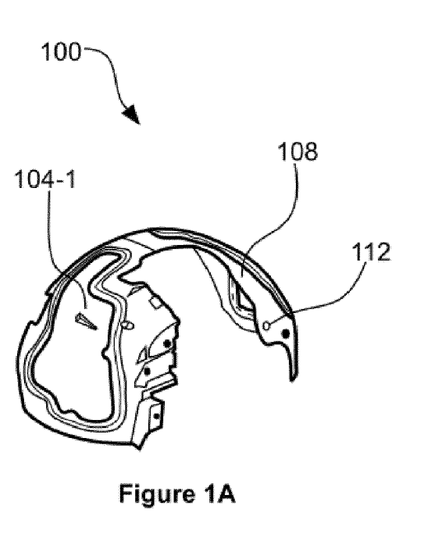
FIGS. 1A-1D depict isometric, top, side and front elevational views, respectively, of an acoustic component, according to a non-limiting embodiment.

Wheel liner 100 includes a first compression molded member 104-1 and a second injection molded member 108. As seen in FIG. 1C, wheel liner 100 also includes a third compression molded member 104-2. In general, wheel liner 100 includes at least one compression molded member, and any suitable number of compression molded members can be incorporated into wheel liner 100.

Compression molded members 104-1 and 104-2 (collectively referred to as compression molded members 104, and generically referred to as a compression molded member 104) comprise a first material or plurality of materials. In general, compression molded members 104 are constructed at least partly of heat- and pressure-sensitive materials which cures in the presence and heat, pressure or both heat and pressure (i.e. thermoset materials). In the present example embodiment, a fabric substrate is used for compression molded members 104.

Figure 2:
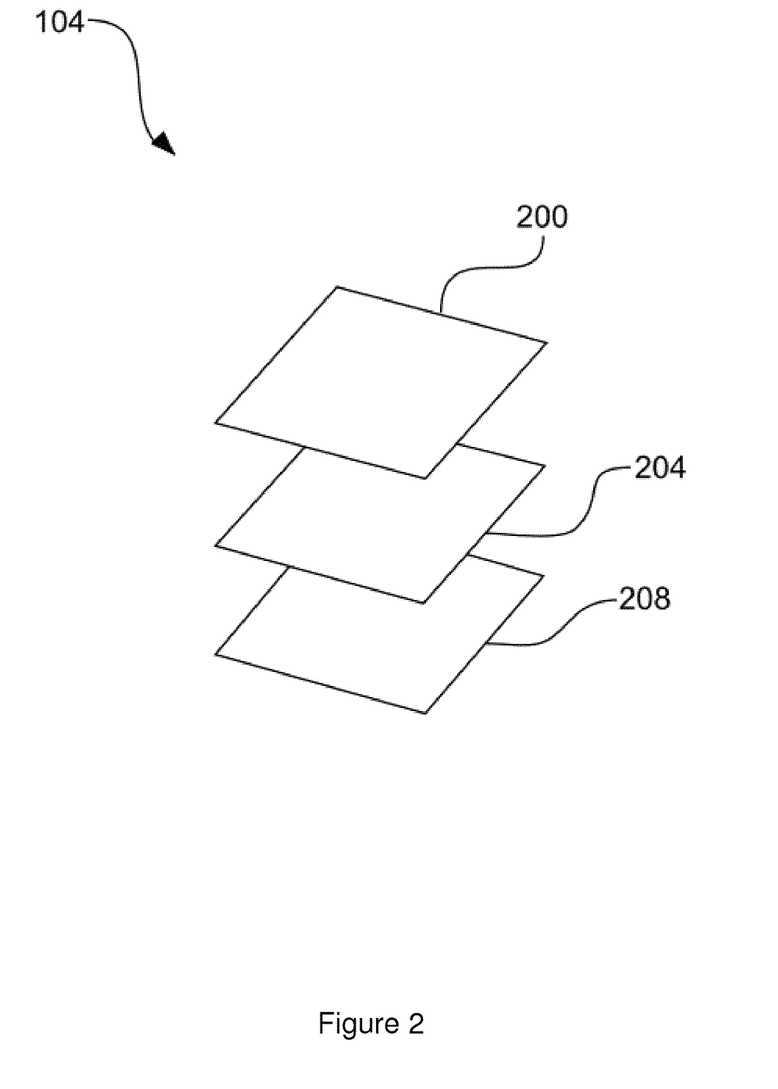
FIG. 2 depicts a schematic exploded view of a compression molded portion of the acoustic component of FIGS. 1A-1D, according to a non-limiting embodiment.

Turning briefly to FIG. 2, a schematic exploded view of a compression molded member 104 prior to compression and heating is depicted. Compression molded member 104 thus includes a plurality of layers of material. In the present example embodiment, compression molded member 104 includes a first (or top) layer 200, a second (or middle) layer 204 and a third (or bottom) layer 208. The first and third layers 200 and 208 are selected for vibration and noise absorption properties and to meet specific harmonics or noise level requirements, based on the application of the resulting wheel liner 100. It is also contemplated that first and third layers 200 and 208 can be replaced with multiple layers of material, depending on the requirements of the particular acoustic component. Examples of materials for the first and third layers 200 and 208 includes polyester fabrics and nylon cloth materials.

Second layer 204 comprises a heat sensitive polymer to which first and third layers 200 and 208 are laminated. Second layer 204 can include, for example, materials such as polypropylene, nylon or any other suitable heat sensitive thermoset material.

Returning to FIGS. 1A-1D, injection molded member 108 is coupled to, and substantially surrounds, compression molded members 104. Injection molded member includes a second material. The second material includes a flowable polymer such as polypropylene. It will now be apparent to those skilled in the art that a variety other suitable polymers can also be employed. In general, the second material is suitable for injection molding to form injection molded member 108.

Injection molded member 108 provides a substantially rigid frame for supporting compression molded members 104 and retaining the desired geometry of wheel liner 100. Injection molded member 108 can also include attachment points, such as opening 112 seen in FIG. 1A, for receiving fasteners to secure wheel liner 100 to an automobile or other vehicle.

Figure 1B:
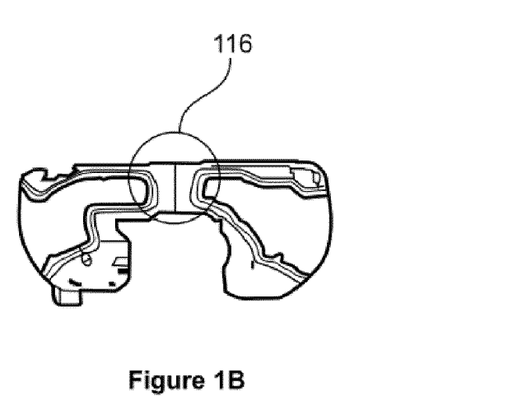
Figure 1C:
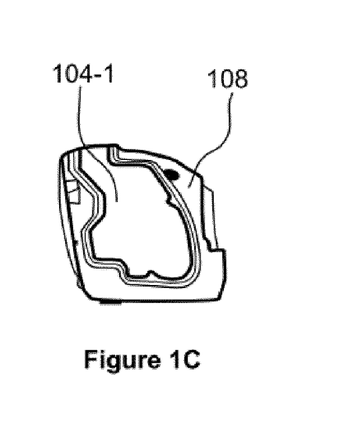
Figure 1D:
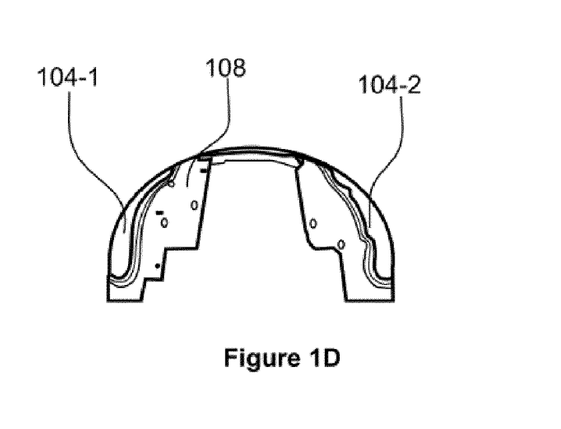
Figure 3:
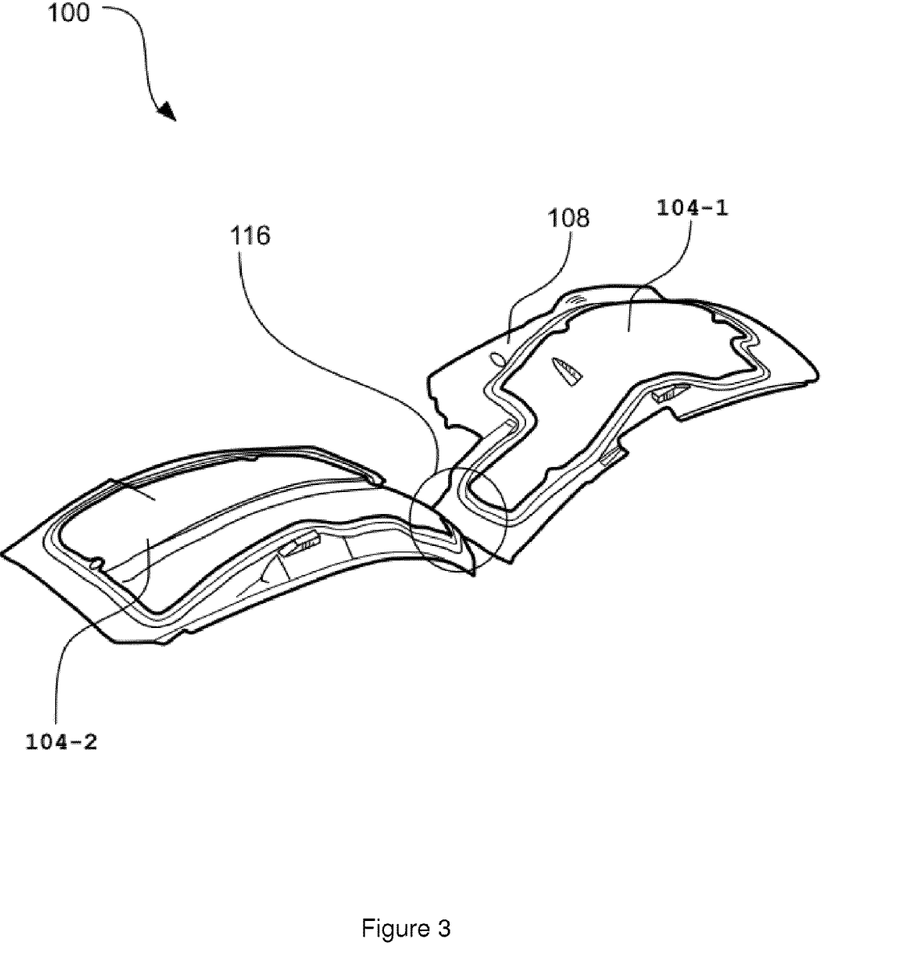
FIG. 3 depicts an isometric view of the acoustic component of FIGS. 1A-1D in a folded configuration, according to a non-limiting embodiment.

As seen in FIG. 1B, injection molded member 108 can also define a living hinge area 116 at which wheel liner 100 can bend. Turning briefly to FIG. 3, wheel liner 100 is shown in the flexed or bent position, in which injection molded member 108 bends at hinge area 116, for example to allow for installation of wheel liner 100 in an automobile.

It is also contemplated that in some embodiments, living hinge area 116 can be provided in part by compression molded members 104. In such embodiments, compression molded members 104-1 and 104-2 can be replaced by a single compression molded member 104 which traverses both "halves" of injection molded member 108, thus crossing through living hinge area 116 within the material of injection molded member 108.

As seen in FIGS. 1A-1D and FIG. 3, each compression molded member 104 is coupled to injection molded member 108 by overmolding of member 108 onto members 104 during the injection molding of member 108. Members 104 thus become bonded to member 108. Further, compression molded members 104 and injection molded member 108 are molded substantially simultaneously. That is, wheel liner 100, during its manufacture, is subject to both injection and compression molding processes during a single molding cycle, as will be discussed in greater detail below in connection with example embodiments of the apparatus used to manufacture wheel liner 100 (and other acoustic components).

Figure 4:
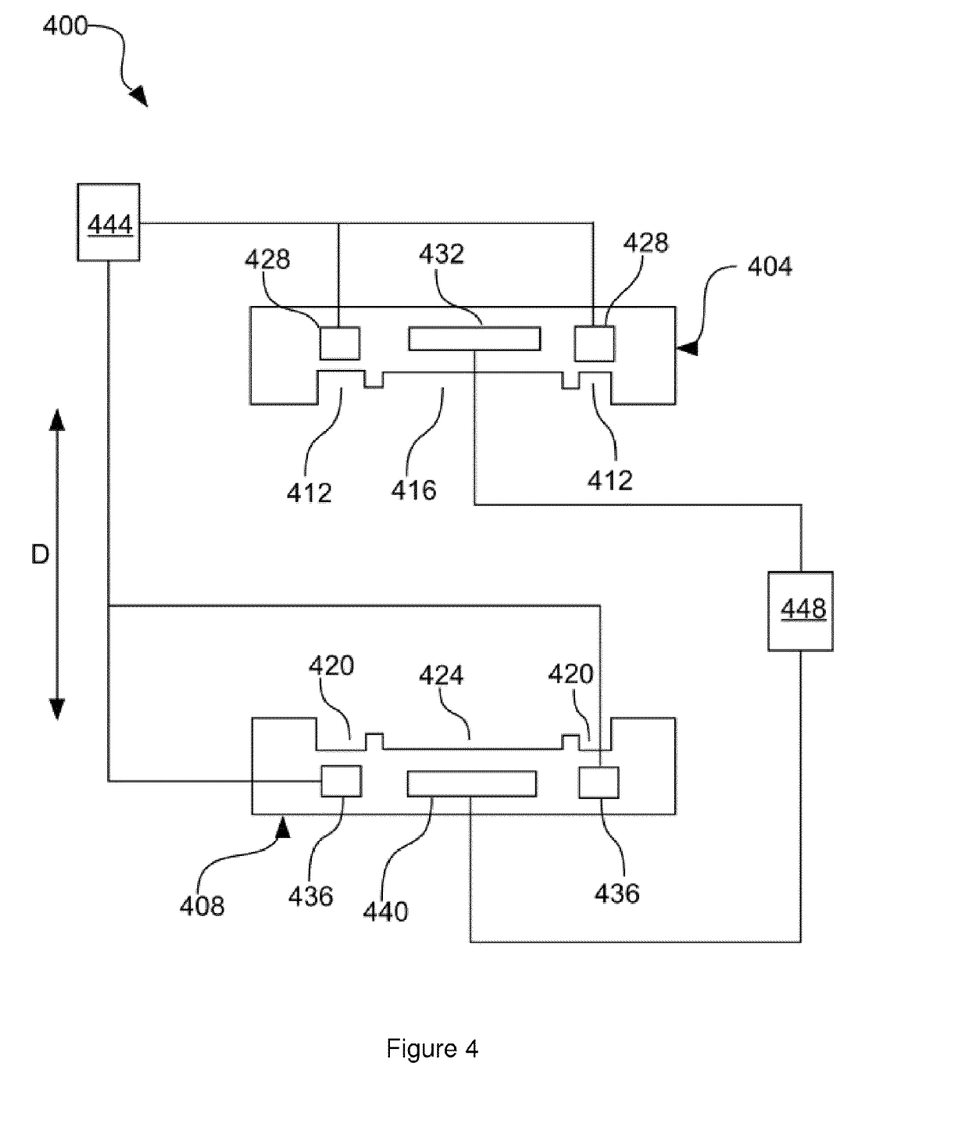
FIG. 4 depicts an apparatus for manufacturing the acoustic component of FIGS. 1A-1D, according to a non-limiting embodiment.

Referring now to FIG. 4, a schematic diagram of an apparatus 400 for manufacturing wheel lining 100 and other acoustic components is shown. Apparatus 400 includes a core portion 404 and a cavity portion 408. Core and cavity portions 404 and 408 have an open position and a closed position relative to each other. In the open position, as depicted in FIG. 4, core and cavity portions 404 and 408 are separated from each other by a certain distance, labelled "D", in order to allow for loading of materials, servicing and the like. Appropriate distances of separation will occur to those skilled in the art through the course of this description. More generally, in the open position, core portion 404 and cavity portion 408 are not sealed together. In the closed position, which will be discussed in further detail below, core portion 404 is matingly received by cavity portion 408, and core portion 404 and cavity portion 408 are reversibly sealed together.

Core portion 404 includes an injection area 412 and a compression area 416. It is noted that while injection area 412 is labelled twice in FIG. 4, injection area 412 is in fact a single injection area surrounding compression area 416, seen in cross-section in FIG. 4. In other embodiments, multiple separate injection areas can be provided as necessary for the particular acoustic component being manufactured. Cavity portion 408 includes a mating injection area 420 and a mating compression area 424. The above-mentioned areas will also be discussed below in further detail in conjunction with the closed position of core portion 404 and cavity portion 408.

Apparatus 400 further includes one or more coolers and one or more heaters. In the present example embodiment, core portion 404 includes a cooler 428 (as with injection area 412, cooler 428 can be a loop, seen twice in cross section in FIG. 4) and a heater 432. As seen in FIG. 4, cooler 428 is adjacent to injection area 412, and heater 432 is adjacent to compression area 416. Cavity portion 408 also includes a cooler 436 adjacent to mating injection area 420, and a heater 440 adjacent to mating compression area 424. It is contemplated that in other embodiments, coolers and heaters may be present in only one of core portion 404 and cavity portion 408.

Coolers 428 and 436 are not particularly limited, and can include any suitable cooling mechanisms, such as cooled fluid circuits. Heaters 432 and 440 are likewise not particularly limited, and can include any suitable heating mechanisms, such as electric (resistive) elements, heated fluid circuits and the like. In general, the materials of core and cavity portions 404 and 408 can include thermally conductive materials between the injection and compression areas and the coolers and heaters, respectively. The materials of core and cavity portions 404 and 408 can further include layers of insulating materials (not shown) between the heaters and coolers, and between the injection and compression areas.

In some embodiments, the sections of core portion 404 and cavity portion 408 which define compression area 416 and mating compression area 424 can be provided in the form of compression molding inserts which are removable from the remainder of the core and cavity portions. Thus, different compression molding inserts can be coupled to core and cavity portions 404 and 408 to accommodate different shapes, thicknesses and materials for the compression molded members of acoustic components. Such compression molding inserts can also carry heaters 432 and 440.

In addition, apparatus 400 includes a first controller 444 connected with coolers 428 and 436, and a second controller 448 connected with heaters 432 and 440. The nature of controllers 444 and 448 are not particularly limited. For example, controllers 444 and 448 can include any of a wide variety of digital controllers, Application-Specific Integrated Circuits (ASICs) and the like. In some embodiments, controllers 444 and 448 can be implemented on a computing device such as a desktop computer having a processor, a memory and input/output devices (e.g. a keyboard and mouse). In such embodiments, controllers 444 and 448 can be implemented as one or more applications stored in the memory and executed by the processor. In general, controller 444 controls coolers 428 and 436, and can also control the injection of flowable polymer, while controller 448 controls heaters 432 and 440.

Figure 5:
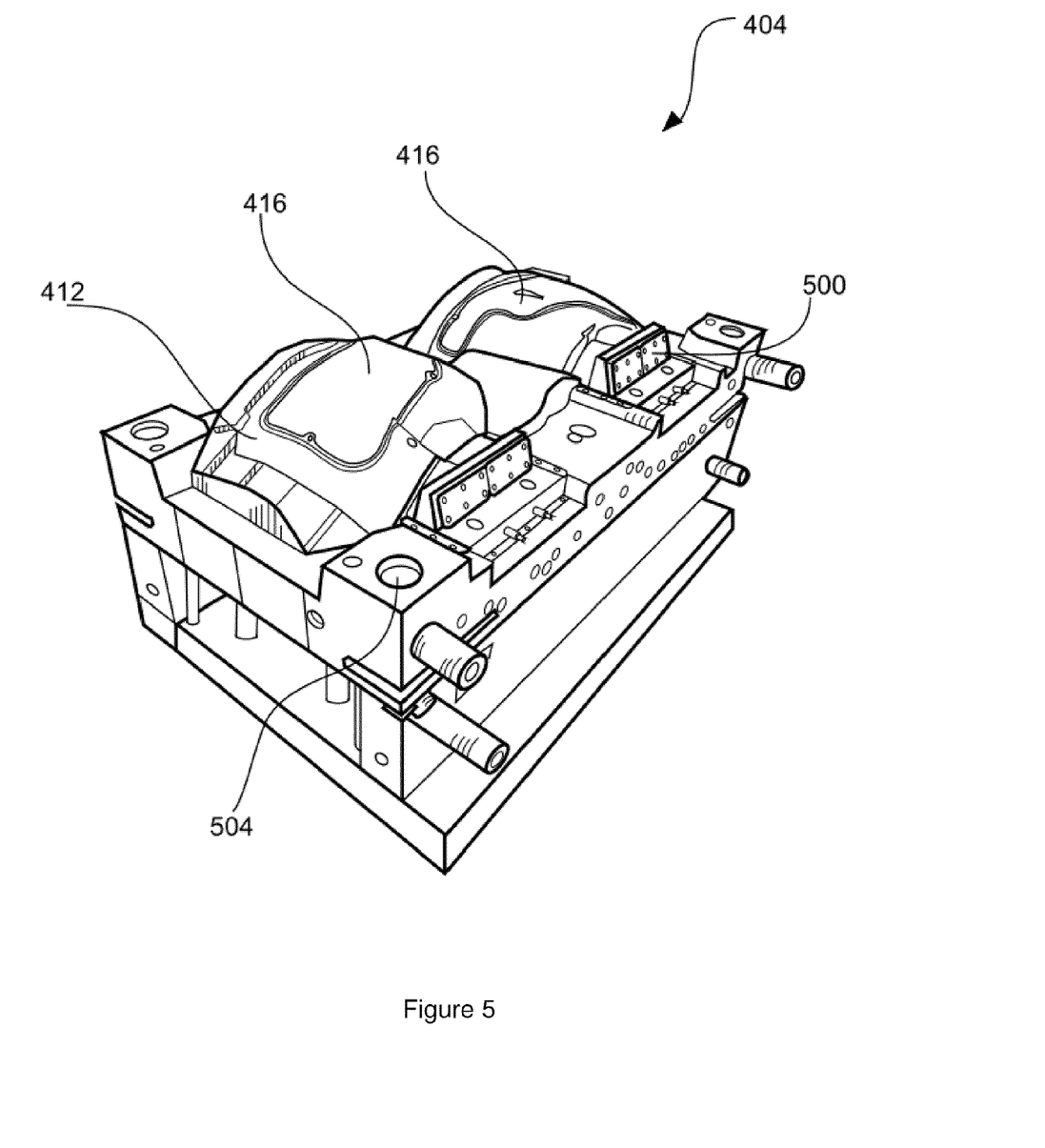
FIG. 5 depicts a core portion of the apparatus of FIG. 4, according to a non-limiting embodiment.

Turning now to FIG. 5, an example core portion 404 is shown, configured for manufacturing wheel liner 100, discussed earlier. Core portion 404 thus includes injection area 412 and compression area 416. As seen in FIG. 5, two compression areas 416 are shown, for accommodating the first and third members 104-1 and 104-2 of wheel liner 100. Injection area 412 surrounds the two compression areas 416. Also included in cavity portion 408 are slide features 500 for forming undercuts in wheel liner 100. It will be appreciated that slide features 500 need not necessarily be present, or can be present in different numbers and configurations. Core portion 404 further includes apertures 504 for coupling and sealing core portion 404 to cavity portion 408.

Figure 6:
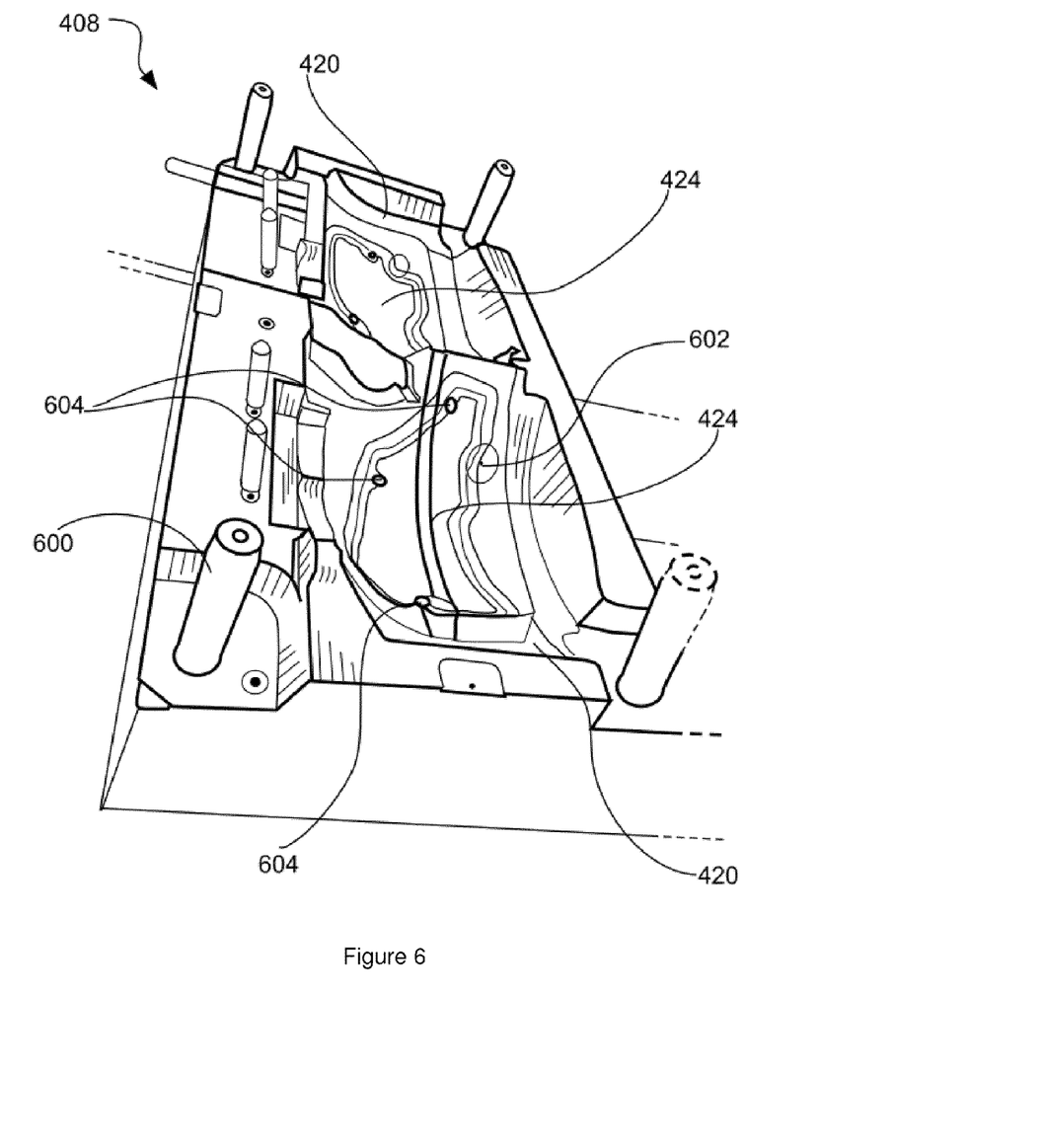
FIG. 6 depicts a cavity portion of the apparatus of FIG. 4, according to a non-limiting embodiment.

Referring to FIG. 6, an example cavity portion 408, corresponding to core portion 404 as shown in FIG. 5, is shown as configured for manufacturing wheel liner 100. Thus, injection area 420 is shown surrounding two compression areas 424. Fasteners 600 are also shown, for cooperating with apertures 504 in sealing core portion 404 and cavity portion 408 together. It can be seen from FIGS. 5 and 6 that when core portion 404 and cavity portion 408 are placed adjacent to each other and coupled, core portion 404 (and particularly injection area 412 and compression areas 416 thereof) is received by, and mates with, cavity portion 408. Also shown in FIG. 6 is an injection inlet 602 for delivering the injection polymer to injection area 412. Additional injection inlets 602 can be provided if suitable. It is contemplated that some injection inlets 602 can be used to deliver injection polymer, while others can be used to deliver cooling fluid to cooler 428.

Figure 7:
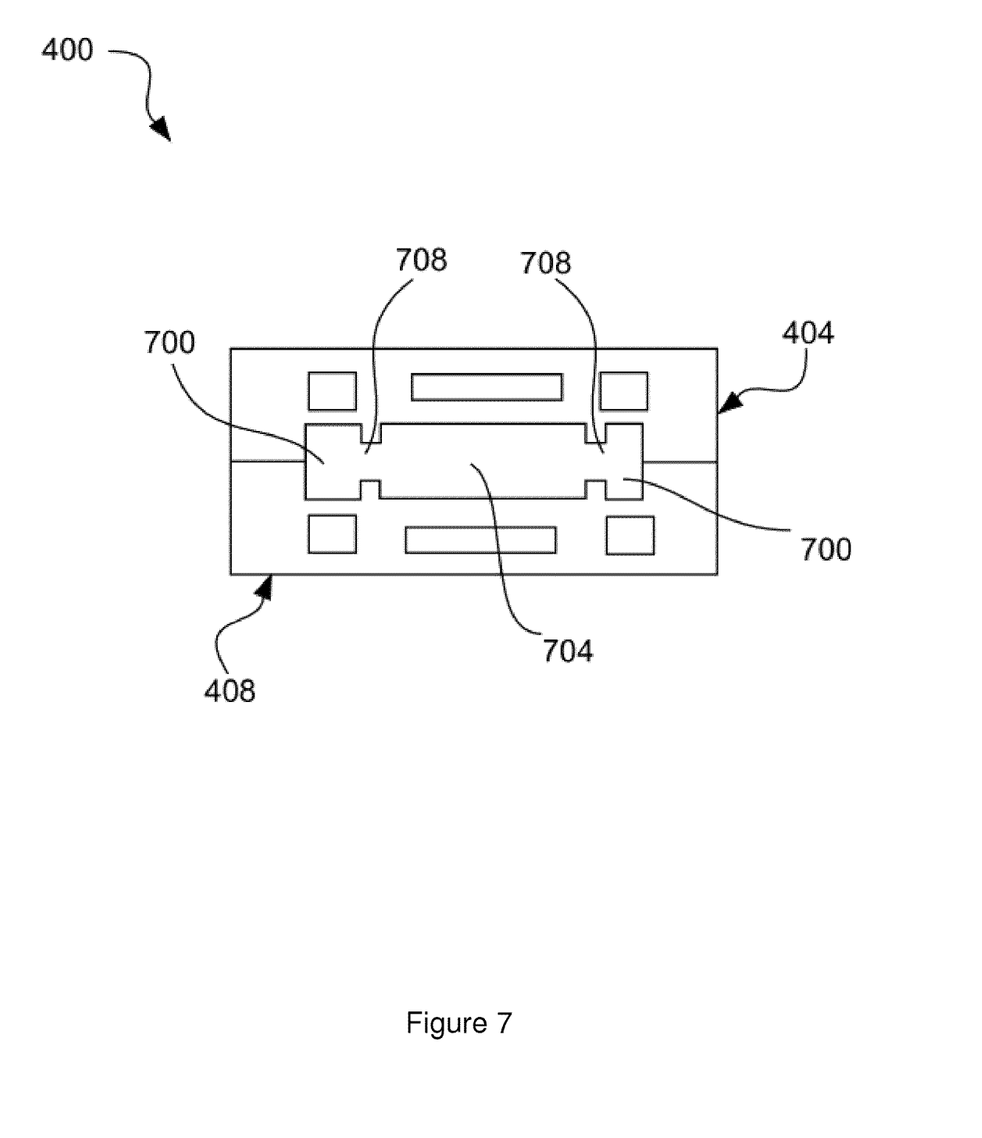
FIG. 7 depicts the apparatus of FIG. 4 in a closed position, according to a non-limiting embodiment.

Turning to FIG. 7, a simplified schematic diagram of core portion 404 and cavity portion 408 in the closed position is shown. In the closed position, core portion 404 and cavity portion 408 are coupled adjacent to one another, for example by way of fasteners 600 and apertures 500. In the closed position, injection area 412 and mating injection area 420 lie adjacent to form an injection channel 700. Compression area 416 and mating compression area 424 also lie adjacent to one another for defining a compression chamber 704 (or, in the example embodiment of FIGS. 5 and 6 for producing wheel liner 100, two compression chambers).

Also shown in FIG. 7 is a seal-off area 708 between injection channel 700 and compression chamber 704. Seal-off area 708, when a fabric substrate is inserted in compression chamber 704, acts to isolate injection channel 700 from compression chamber 704, with a portion of the fabric substrate protruding into injection channel 700 for overmolding.

From the above description, a method of producing an acoustic component will now be apparent, as will be discussed below.

In use, core portion 404 is equipped with an appropriate compression molding insert having the desired configuration (i.e. shape, depth and the like), and heater 432. Core portion 404 then receives, in the open position, a fabric insert as discussed above in connection with wheel liner 100. To that end, the fabric insert can include mounting holes, tabs, slots and the like for cooperating with corresponding protrusions, pins and the like on core portion 404 for accurately locating the fabric insert and maintaining the fabric insert in position while core portion 404 and cavity portion 408 are moved to the closed position. In the present example embodiment, at least one of core portion 404 and cavity portion 408 include retractable pins which are received through mounting holes near the edge of the fabric insert. Once apparatus 400 is in the closed position, the pins can retract such that the mounting holes are filled with injection molding material, thus advantageously substantially preventing the transfer of noise, water, dirt or other foreign materials from one side of the acoustic component to the other.

Turning briefly to FIG. 6, a plurality of channels into which mounting pins can retract are shown at 604. Any suitable number of such pins and channels 604 can be provided in either one of core portion 404 and cavity portion 408. It is also contemplated that the fabric substrate can be placed in cavity portion 408 in the open position, rather than in core portion 404.

Figure 8A:
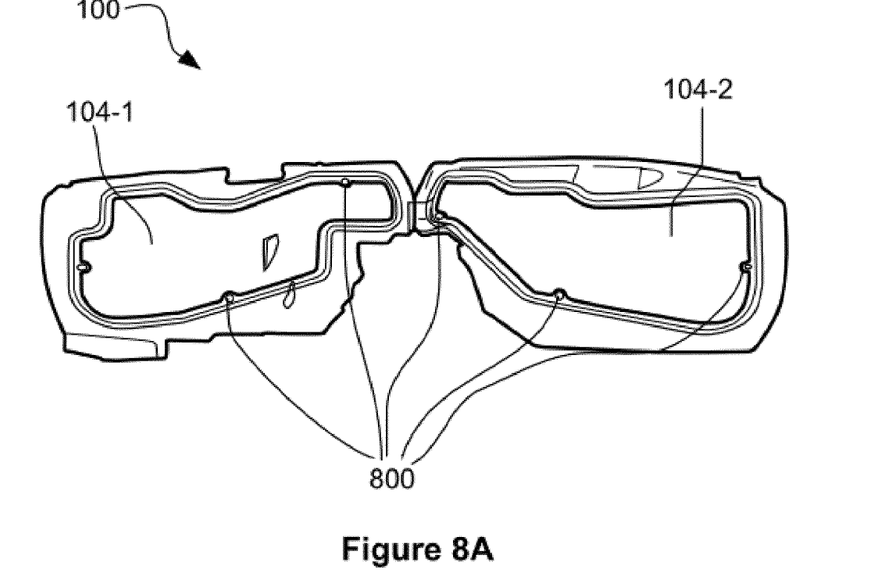
FIG. 8 depicts the arrangement of mounting holes and mounting pins in conjunction with the acoustic component of FIGS. 1A-1D.
Figure 8B:
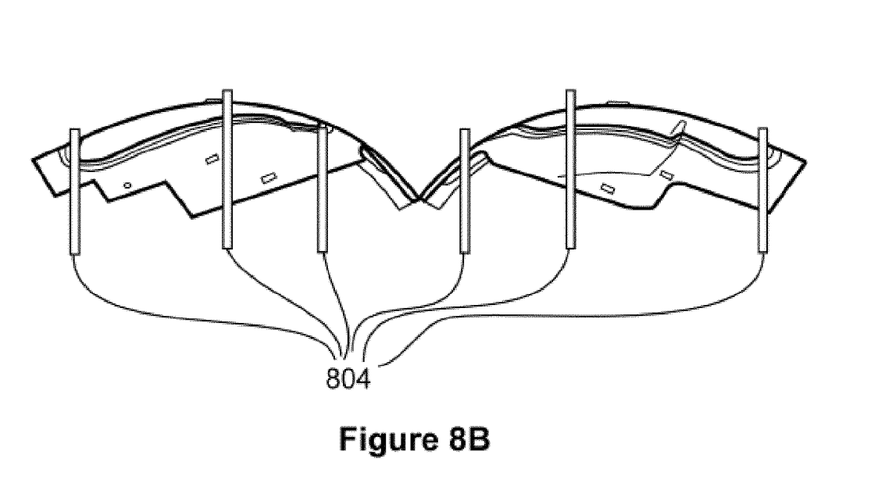

Turning to FIG. 8A, top and front views of wheel liner 100 are shown, with mounting holes indicated at 800 in compression members 104-1 and 104-2. FIG. 8B depicts the insertion of mounting pins 804 into mounting holes 800 to locate the fabric insert and hold the fabric insert in position.

Following the closing of apparatus 400, controllers 444 and 448 can be activated, substantially simultaneously, to inject flowable polymer into injection channel 700 while cooling injection channel 700, and to heat compression chamber 704. Thus, the different areas of apparatus 400 are configured for substantially simultaneous operation in two modes (injection and compression molding), with two separately controllable sets of operating conditions (such as operating temperature).

Once the mold cycle is complete, apparatus 400 can be returned to the open position for retrieval of the completed acoustic component (such as wheel liner 100).

Figure 9:
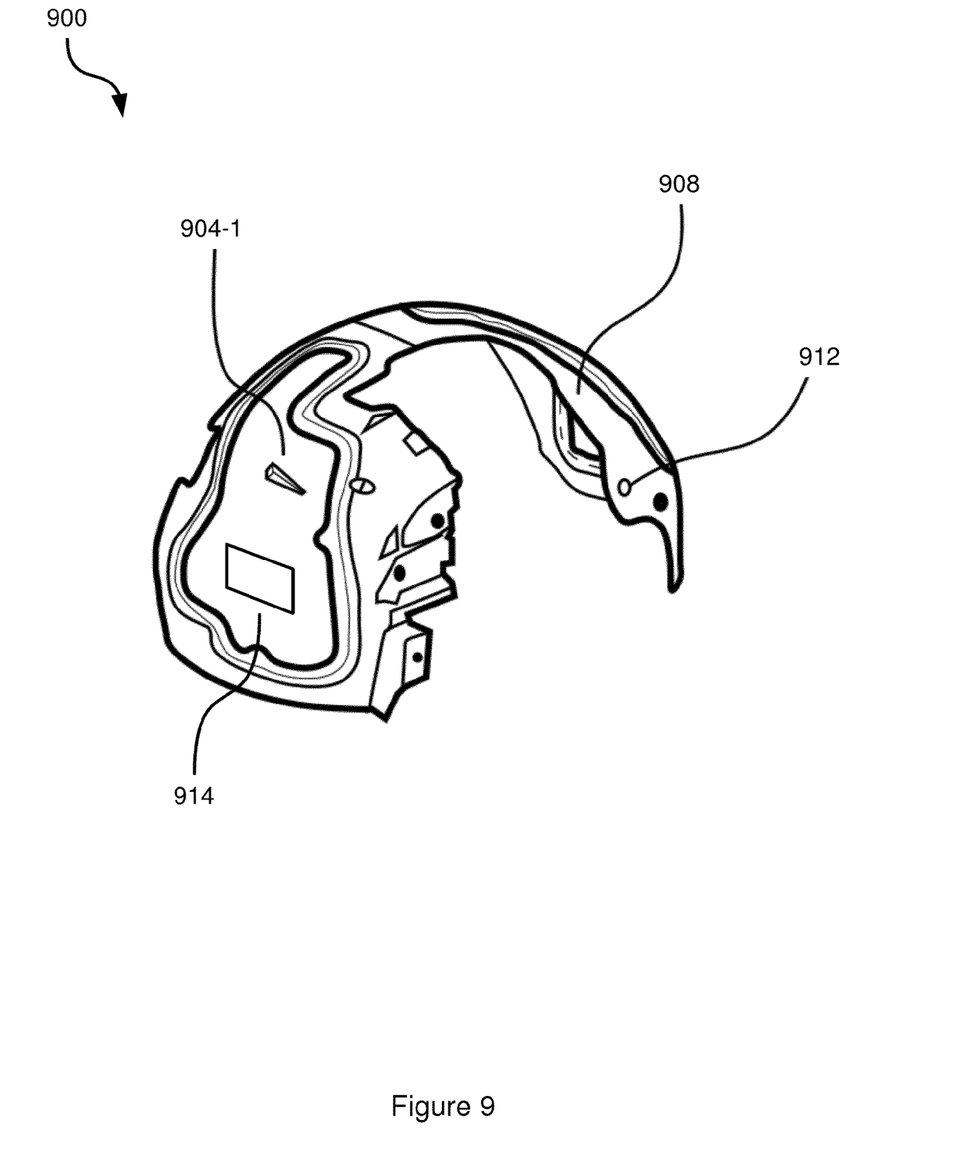
FIG. 9 depicts an acoustic component according to another non-limiting embodiment.

Referring now to FIG. 9, an example variation of wheel liner 100 is shown. In particular, FIG. 9 shows a wheel liner 900 having a first compression molded member 904-1 similar to member 104-1 described above, and a second injection molded member 908 similar to memory 108 described above. An opening 912 (similar to opening 112) is also shown.

Wheel liner 900 also includes an access door 914. Access door 914 is openable to provide an access opening through member 904-1. Such an opening can be used, for example, to access and replace indicator lights of an automobile in which wheel liner 900 is installed. Further discussion of access door 914 will be provided in connection with FIGS. 10A and 10B.

Figure 10A:
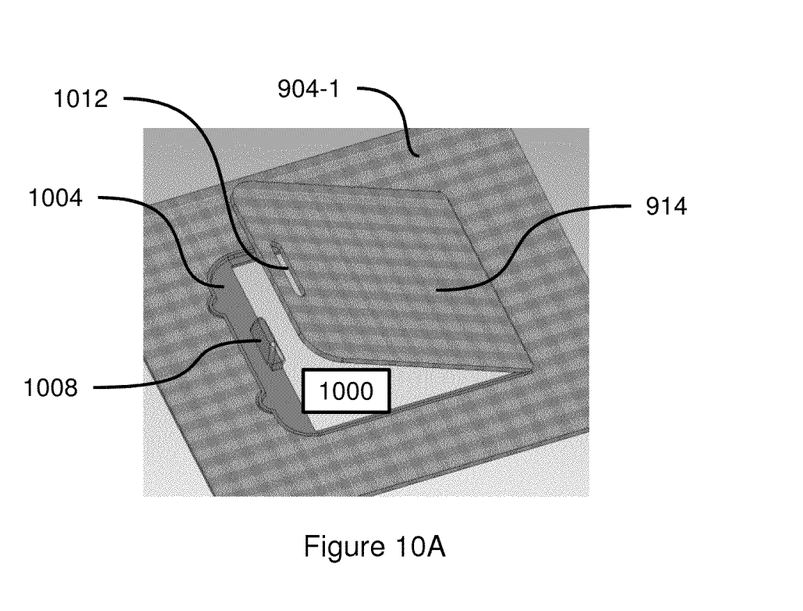
FIGS. 10A and 10B depict an access door of the acoustic component of FIG. 9, according to a non-limiting embodiment.

Turning to FIG. 10A, access door 914 is shown in an open position. When in the open position, access door 914 reveals an access opening 1000 extending through member 904-1. As seen in FIG. 10A, access door 914 is formed of the same material as member 904-1, and is joined with the remainder of member 904-1. In other words, access door 914 can be cut from the material which forms member 904-1 (such as the material shown in FIG. 2). Also seen in FIG. 10A is a support frame 1004 for access door 914, and a lock member 1008. Support frame 1004 and lock member 1008 are formed from the second material (e.g. the injection molded material) discussed above, and not from the same material as access door 914.

Lock member 1008 is configured to releasably fit through a die-cut slot 1012 in access door 914. In particular, locking member 1008 has at least one dimension that is larger than a corresponding dimension of slot 1012 (in the present example, the width of lock member 1008 is greater than the width of slot 1012). However, lock member 1008 can still be inserted through slot 1012 and removed from slot 1012, when sufficient force is applied, as a result of the flexibility of the material of access door 914.

Figure 10B:
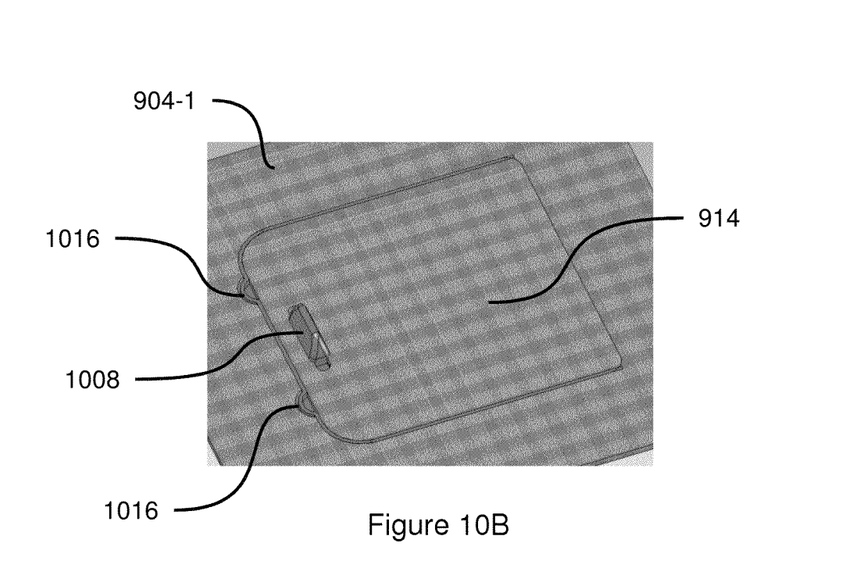

FIG. 10B shows access door 914 in the closed position, obstructing opening 1000. In the closed position, lock member 1008 extends through slot 1012, thus retaining access door 914 in the closed position until sufficient force is applied to access door 914 to dislodge lock member 1008. Such force can be applied, for example, to one or more pry slots 1016 defined by support frame 1004. Pry slots 1016 allow an object (e.g. a finger, a screwdriver, and the like) to be inserted underneath access door 914 for applying force to open access door 914.

It is contemplated that access door 914 and support frame 1004 can be produced in the same process as the remainder of wheel liner 900. That is, the molds discussed above can include supplementary injection molding channels for support frame 1004 and lock member 1008. The molds can also include means for cutting access door 914 from wheel liner

900. In other embodiments, access door 914 can be pre-cut before the compression-molding material for member 904-1 is inserted in the molds.

Various advantages to the above methods, system and apparatus will now occur to those skilled in the art. For example, the single-cycle production of an acoustic component (including accessories such as access door 914) reduces the need for post-processing or separate manufacturing of the compression and injection members 104 and 108, while providing additional noise frequency reductions and reduced noise harmonics in the vehicle or other machinery during operation. Other advantages will now also occur to those skilled in the art.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. An acoustic component, comprising:
    a first compression-molded member comprising a first material; the first member defining a first portion of an inner surface of the acoustic component and a first portion of an outer surface of the acoustic component, the first member having an edge; and
    a second injection-molded member overmolded to the edge of the first member, the second member comprising a second material; the second member defining a second portion of the inner surface of the acoustic component and a second portion of the outer surface of the acoustic component; the second member defining the perimeter of the acoustic component.

2. The acoustic component of claim 1, wherein the first material includes a fabric substrate comprising at least one layer.

3. The acoustic component of claim 1, wherein the second material includes a flowable polymer.

4. The acoustic component of claim 3, wherein the polymer is polypropylene.

5. The acoustic component of claim 1, further comprising a third compression-molded member comprising the first material, the third member being coupled to and substantially surrounded by the second member.

6. The acoustic component of claim 1, wherein the first member and the second member are molded substantially simultaneously.

7. The acoustic component of claim 1, wherein the acoustic component is a wheel liner.

* * * * *